United States Patent Office 3,106,561
Patented Oct. 8, 1963

3,106,561
CERTAIN 2-(2'-LOWER ALKANOYL-AMIDO-PHENYLTHIO)-3-NITROPYRIDINES
Harry Louis Yale and Jack Bernstein, New Brunswick, N.J., assignors to Olin Mathieson Chemical Corporation, New York, N.Y., a corporation of Virginia
No Drawing. Original application July 26, 1955, Ser. No. 524,617, now Patent No. 2,943,086, dated June 28, 1960. Divided and this application May 6, 1960, Ser. No. 40,985
2 Claims. (Cl. 260—294.8)

This application is a division of our parent application, Serial No. 524,617, filed July 26, 1955, U.S. Patent No. 2,943,086.

This invention relates to new 10-substituted-1-azaphenothiazines (and their salts) having valuable therapeutic properties, processes for the preparation thereof, and new intermediates utilizable in said processes.

The therapeutically active compounds of this invention include 1-azaphenothiazines (and their salts) of the general formula

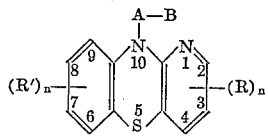

wherein R and R' are alike or different and represent hydrogen, halogen, hydroxy, lower alkyl, lower alkoxy, and trihalo-(lower alkyl); n is a positive integer less than four; A is lower alkylene, or hydroxy-(lower alkylene), or oxo-(lower alkylene), e.g.

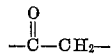

and B is a nitrogen-containing radical of less than twelve carbon atoms, such as: amino; (lower alkyl)amino; di-(lower alkyl)amino; (hydroxy-lower alkyl)amino; di-(hydroxy-lower alkyl)amino; piperidyl [i.e. piperidino, 2-piperidyl, 3-piperidyl, or 4-piperidyl]; (lower alkyl)piperidyl [e.g. 2, 3, or 4-(lower alkyl)piperidino; or 2, 3, or 4-(N-lower alkyl)piperidyl]; di(lower alkyl)piperidyl [e.g. 2,4- 2,6-, or 3,5-di(lower alkyl)piperidino; or 2, 3, or 4-(N-lower alkyl-2, 3, or 4-lower alkyl)piperidyl]; (lower alkoxy)-piperidyl; pyrrolidyl; (lower alkyl)pyrrolidyl; di(lower alkyl)pyrrolidyl; (lower alkoxy)pyrrolidyl; morpholinyl [i.e. morpholino, 2-morpholinyl or 3-morpholinyl]; (lower alkyl)-morpholinyl; di(lower alkyl)morpholinyl; (lower alkoxy)morpholinyl; thiamorpholinyl; (lower alkyl)thiamorpholinyl; di(lower alkyl)-thiamorpholinyl; (lower alkoxy)thiamorpholinyl; piperazyl; (lower alkyl)piperazyl; di(lower alkyl)piperazyl; and (lower alkoxy)piperazyl. The terms "lower alkyl," "lower alkoxy," "lower alkylene," "hydroxy-(lower alkylene)" and "oxo-(lower alkylene)," as employed herein, include both straight and branched chain radicals.

As to the salts of the 1-azaphenothiazines, those coming within the purview of this invention include the acid-addition salts, particularly the non-toxic acid-addition salts. Acids useful for preparing the acid-addition salts include, inter alia, inorganic acids, such as the hydrohalic acids (e.g. hydrochloric and hydrobromic acid), sulfuric acid, nitric acid, and phosphoric acid, and organic acids such as oxalic, tartaric, citric, acetic, boric, and succinic acid.

The 10-aminoalkyl-1-azaphenothiazines of this invention and the acid-addition salts thereof are therapeutically active compounds which are utilizable as both antihistaminic and ataractic, or tranquilizing agents. Thus 10-(2-dimethylaminoethyl) - 1 - azaphenothiazine hydrochloride has many times the activity of 10-(2-dimethylamino-1-propyl)phenothiazine hydrochloride; and it can be administered perorally in the same manner as the latter compound in the treatment of allergies. The dosage for such treatment must, of course, be adjusted for the increased activity of the 1-azaphenothiazine. Also, when 10-(3'-dimethylaminopropyl)-1-azaphenothiazine hydrochloride, for example, is utilized in the same manner as 10-dimethylaminopropyl-2-chlorophenothiazine, and in appropriately adjusted dosage, it produces the same tranquilizing action.

The process for preparing the 10-aminoalkyl-1-azaphenothiazines of this invention can be illustrated by the following equations:

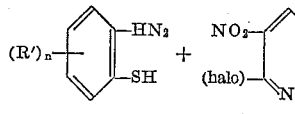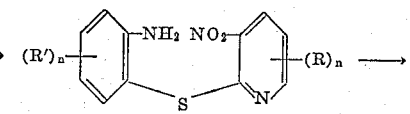

(I)    (II)    (III)

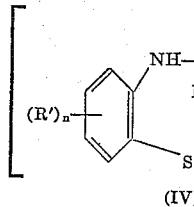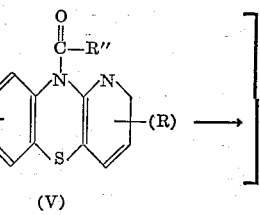

(IV)    (V)

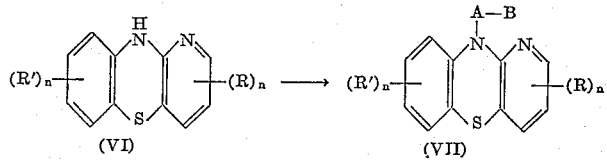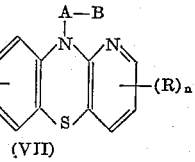

(VI)    (VII)

In accordance with the first step of our process, a 2-aminobenzenethiol (Compounds I) is condensed with a 2-halo-3-nitropyridine (Compounds II) to form a 2-(2'-aminophenylthio)-3-nitropyridine (Compounds III), which are new compounds. This step is preferably conducted by intermixing the 2-aminobenzenethiol and 2-halo-3-nitropyridine reactants in approximately stoichiometric amounts in the presence of a base, such as an alkali metal hydroxide (e.g. potassium hydroxide), an alkali metal carbonate, or an alkali metal alcoholate (e.g. sodium alkoxide). The reaction can be carried out at any temperature from below room temperature to reflux.

The 2-(2'-aminophenylthio)-3-nitropyridine thus formed can then be recovered, as by filtration.

Suitable 2-aminobenzenethiols utilizable in this step of the process include: 2-aminobenzenethiol; 2-amino-X-halobenzenethiols (especially those wherein the halo is chloro or bromo), as exemplified by 2-amino-4-chlorobenzenethiol, 2-amino-4-bromobenzenethiol, 2-amino-3-chlorobenzenethiol, 2 - amino - 5 - chlorobenzenethiol, and 2 - amino - 6 - chlorobenzenethiol; 2 - amino-X,X' - dihalobenzenethiols; 2 - amino - X - hydroxybenzenethiols; 2 - amino - X - (lower alkyl)benzenethiols (especially those wherein the lower alkyl is methyl or ethyl) as exemplified by 2-amino-4-methylbenzenethiol, 2 - amino - 4 - ethylbenzenethiol, 2 - amino - 3 - methylbenzenethiol, 2 - amino - 5 - methylbenzenethiol, and 2 - amino - 6 - methylbenzenethiol; 2 - amino - X,X'-di(lower alkyl)benzenethiols; 2 - amino - X,X',X''-tri(lower alkyl)benzenethiols; 2 - amino - X - halo-X' - (lower alkyl)benzenethiols; 2 - amino - X - (lower alkoxy)benzenethiols (especially those wherein the lower alkoxy is methoxy); 2-amino-X,X'-di(lower alkoxy)benzenethiols; and 2 - amino - X - (lower alkyl) - X' - (lower alkoxy)benzenethiols. [X, X', and X'' represent, of course, positions in the benzene nucleus other than the 1- and 2-positions.]

The 2-halo-3-nitropyridines utilizable in the first step of the process of this invention are preferably the 2-iodo-, 2-bromo- and especially the 2-chloro-3-nitropyridines. Examples of such pyridine reactants are: 2 - chloro - 3 - nitropyridine; 2 - chloro - X - halo - 3 - nitropyridines (especially those wherein the halo is chloro), as exemplified by 2,5-dichloro-3-nitropyridine and 2,6 - dichloro - 3 - nitropyridine; 2 - chloro - X - hydroxy - 3 - nitropyridines; 2 - chloro - X - (lower alkyl)-3-nitropyridines (especially those wherein the lower alkyl is methyl or ethyl), as exemplified by 2-chloro-3-nitro-4 - picoline, 6 - chloro - 5 - nitro - 2 - picoline, 6 - chloro - 5 - nitro - 3 - picoline, 2 - chloro - 3 - nitro - 4 - ethylpyridine, 2 - chloro - 3 - nitro - 5 - ethyl - pyridine, and 2 - chloro - 3 - nitro - 6 - ethylpyridine; 2 - chloro - X,X' - di(lower alkyl) - 3 - nitropyridines (especially those wherein the lower alkyls are methyl or ethyl, as exemplified by 6 - chloro - 5 - nitro - 2,4 - lutidine and 6 - chloro - 5 - nitro - 3,4 - lutidine; 2 - chloro-X - halo - X' - (lower alkyl) - 3 - nitropyridines (especially those wherein the halo is chloro and the lower alkyl is methyl or ethyl); 2-chloro-X-(lower alkoxy)-3-nitropyridines; 2 - chloro - X - (lower alkyl) - X' - (lower alkoxy) - 3 - nitropyridines; and 2 - chloro-X,X',X''-tri(lower alkyl)-3-nitropyridines. [X, X' and X'' represent, of course, positions in the pyridine nucleus other than the 2- and 3- positions.]

According to the next step in the process of this invention, the 2 - (2' - aminophenylthio) - 3 - nitropyridine (Compounds III) formed in the first step is cyclized and rearranged by treatment with an alkali to a 1-azaphenothiazine (Compounds VI), which is a new compound. [1-azaphenothiazine can also be named 10-H-pyrido[3,2-b][1,4]benzothiazine but for convenience will be denoted hereinafter by the former, more concise name.]

This cyclization and rearrangement can be done in one, two, or three steps depending on the conditions of the reaction(s). Thus, if a Compound III is treated with two equivalents of an alkali, such as sodium hydroxide or potassium hydroxide, a Compound VI is obtained directly but in relatively low yield. If a Compound III is treated with an acylating agent, such as an acid anhydride (R''CO)₂O or acyl halide (R''COhalogen)

preferably chloride, wherein R'' is an organic radical such as a hydrocarbon radical of less than ten carbon atoms (e.g. lower alkyl, aryl, or aralkyl), the corresponding new N-acylated derivative (Compounds IV) is formed. This reaction is most advantageously effected by treatment of Compounds III with a carboxylic acid anhydride (optimally a lower fatty acid anhydride, such as acetic anhydride), preferably in the presence of a catalyst such as an organic base (e.g. pyridine or collidine) or a carbonyl chloride (e.g. a lower fatty acid chloride, such as acetyl chloride). Compounds IV, thus formed, can then be either converted to Compounds VI directly by treatment with two equivalents of alkali or, preferably, converted to the corresponding new 10-acylated-1-azaphenothiazine (Compounds V) by treatment with one equivalent of alkali. Both of these reactions are preferably conducted in an organic solvent for the alkali (optimally in a dilute solution). Suitable organic solvents include alcohols or ketones. Since the cyclization and rearrangement reactions are rapid, and in order to quickly terminate the reaction thereby minimizing the possibility of undesired competing side-reactions, the solvent should be one which is volatile and hence easily removed from the reaction mixture by distillation or evaporation. Suitable volatile solvents include the lower alkanols (e.g. ethanol) and di(lower alkyl)ketones (e.g. acetone). Compounds V are then hydrolyzed by treatment with either an acid (e.g. hydrochloric acid) or a base (e.g. sodium hydroxide) to yield the corresponding 1-azaphenothiazine (Compounds VI).

These new 1-azaphenothiazines (Compounds VI) are then converted to their 10-substituted derivatives (Compounds VII) by one of several different methods. Thus, the 10-unsubstituted starting compound can be reacted with an amino-(lower alkyl)-halide, wherein the halogen is preferably, iodine, bromine, or chlorine (optimally chlorine), in the presence of an acid acceptor, such as an alkali metal, an alkali metal alcoholate, an alkali metal hydride, and preferably an alkali metal amide (e.g. sodamide), thereby directly forming Compounds VII. Also, the 10-unsubstituted starting compounds can be reacted with an amine (lower alkanoyl) halide, thereby forming the 10-aminoalkanoyl derivative, which may, if desired, be reduced as by treatment with lithium aluminum hydride to Compounds VII; and alternatively, the 10-aminoalkanoyl derivative can be obtained by reacting the 10-unsubstituted compound with a halo-acyl halide (e.g. chloroacetyl chloride), and the resulting 10-halo-acyl derivative when reacted with an appropriate amine. Also, the 10-unsubstituted starting material can be reacted with an epoxyamino(lower alkane) in the presence of an acid acceptor, thereby directly forming Compounds VII, wherein the A radical is a hydroxy-lower alkylene. Also, the 10-unsubstituted starting compound can be reacted with an acrylonitrile thereby forming a 10-cyanolower alkyl-1-azaphenothiazine, which can be reduced with lithium aluminum hydride to yield a 10-primary amino(lower alkyl)-1-azaphenothiazine (Compounds VII, wherein B is amino), which can subsequently be converted, if desired, to a 10-secondary or teritary amino(lower alkyl)-1-azaphenothiazine. Furthermore, the 10-unsubstituted starting material can be reacted with a compound of the formula R'''—O—A-halogen, wherein R''' is an organic radical such as an aromatic radical (e.g. phenyl) or a heterocyclic radical (e.g. tetrahydropyranyl), thereby forming a 1-azaphenothiazine having a 10-R'''—O—A-substituent; the latter can then be either directly converted to a 10-halo-(lower alkyl)-substituted 1-azaphenothiazine by treatment with aluminum chloride in carbon bisulfide, or first to a 10-hydroxy(lower alkyl)-substituted 1-azaphenothiazine by hydrolysis with hydrochloric acid in alcohol and thence to the 10-halo(lower alkyl)-derivative by halogenation with a thionyl halide (e.g. thionyl chloride). The 10-halo(lower alkyl)-1-azaphenothiazine is then condensed with an amine of the formula BH in the presence of an acid acceptor to form Compounds VII.

The free bases, Compounds VII, can then, if desired, be converted to acid-addition salts by treatment with the desired acid. This reaction is preferably conducted in an inert organic solvent under substantially anhydrous conditions by treating a Compound VII with approximately one or two equivalents of acid, whereby the mono- or di-acid-addition salt is formed respectively.

The following examples illustrate the invention, the first three examples disclosing methods for preparing the 2-(2'-aminophenylthio)-3-nitropyridines of this invention:

EXAMPLE 1

2-(2'-Aminophenylthio)-3-Nitropyridine

To a solution of 250 g. (2.0 moles) of 2-aminobenzenethiol in 1 liter of methanol which has been diffused with nitrogen for 15 min. is added dropwise (½ hour) while stirring a solution of 132 g. (2 moles of 85% potassium hydroxide in 1 liter of 95% alcohol. The temperature which has been maintained at 5–10° C. is allowed to rise to 15° C. and a solution of 315 g. (2.0 moles) of 2-chloro-3-nitropyridine in 3 liters of warm methanol is added gradually (2 hours) with vigorous stirring. After stirring for an additional hour, the reaction mixture is cooled to 0°, stirred briefly (15 minutes), the product filtered and washed by stirring with 1.5 liters of cold water, M.P. about 124–126°. The yield is about 477.5 g. (96%).

Analysis.—Calcd. for $C_{11}H_{19}N_3O_2S$: C, 53.42; H, 3.66; N, 16.99; N. E. 247.3. Found: C, 53.74; H, 3.92; N, 13.63; N. E. 245.

EXAMPLE 2

2-(4'-Chloro-2'-Aminophenylthio)-3-Nitropyridine

By employing 2 moles of 2-amino-4-chlorobenzenethiol [cf. Lankelma and Kanuf, J. Am. Chem. Soc. 53, 309 (1931)], in place of 2-aminobenzenethiol in Example 1, there is obtained a good yield of 2-(4'-chloro-2'-aminophenylthio)-3-nitropyridine.

EXAMPLE 3

2-(2'-Aminophenylthio)-6-Chloro-3-Nitropyridine

To a solution of 25 g. of 2-aminobenzenethiol in 100 ml. of methanol, which has been diffused with nitrogen, is added dropwise a solution of 13.2 g. of potassium hydroxide in 100 ml. of 95% ethanol. Subsequently, there is added 19.3 g. of 2,6-dichloro-3-nitropyridine. The mixture is refluxed for one hour, cooled and filtered to give 2-(2'-aminophenylthio)-6-chloro-3-nitropyridine. The 2,6-dichloro-3-nitropyridine reactant is prepared by the direct chlorination of 3-aminopyridine, with subsequent oxidation of the 2,6-dichloro-3-aminopyridine with 30% hydrogen peroxide. The 2,6-dichloro-3-nitropyridine reactant can also be prepared by the reaction of 2,6-dihydroxy-3-bromopyridine with aqueous ammonia and copper sulfate to give 3-amino-2,6-dihydroxypyridine, which is then converted to 2,6-dichloro-3-aminopyridine by treatment with $PCl_5$—$POCl_3$ and thence by hydrogen peroxide oxidation to 2,6-dichloro-3-nitropyridine.

By substituting various other $(R')_n$-substituted-2-aminobenzenethiols for the 2-aminobenzenethiol of Example 1 or 3 or the 2-amino-4-chlorobenzenethiol of Example 2, the correspondingly substituted 2-(2'-aminophenylthio)-3-nitropyridines are prepared. Similarly, if various other $(R)_n$-substituted-2-chloro-3-nitropyridines are substituted for the 2-chloro-3-nitropyridine of Example 1 or 2 or the 2,6-dichloro-3-nitropyridine of Example 3, the correspondingly substituted 2-(2'-aminophenylthio)-3-nitropyridines are prepared. In those instances where the desired $(R)_n$-substituted-2-chloro-3-nitropyridine reactant is not commercially available, it can be readily prepared from desired $(R)_n$-substituted-2-aminopyridine by nitrating the latter with nitric acid and converting the $(R)_n$-substituted-2-amino-3-nitropyridine thus formed to the corresponding $(R)_n$ - substituted-2-chloro-3-nitropyridine by treatment of the former with nitrous acid and hydrochloric acid.

The following three examples disclose methods for preparing the 2-(2'-acylamidophenylthio)-3-nitropyridines of this invention:

EXAMPLE 4

2'-(3-Nitro-2-Pyridylthio)Acetanilide

To a mixture of 1750 ml. of acetic anhydride and 200 ml. of pyridine is added gradually (½ hour) at 20–30° C. while stirring vigorously 483 g. (1.95 mole) of 2-(2'-aminophenylthio)-3-nitropyridine. The reaction is then heated at 85° C. on the steam bath for 15 minutes and cooled to 0°. After stirring for ½ hour, the product is filtered, stirred with 1.5 liters of water, filtered and dried. The yield of product, M.P. about 141–142°, is about 388 g. (69%). After recrystallization from isopropanol, the 2'-(3-nitro-2-pyridylthio)acetanilide obtained melts at about 138–139° C. Analysis.—Calcd. for $C_{13}H_{11}N_3O_3S$: C, 53.96; H, 3.83. Found: C, 54.23; H, 3.79.

EXAMPLE 5

2'-(3-Nitro-2-Pyridylthio)-4'-Chloro-Acetanilide

By employing 2 moles of 2-(4'-chloro-2'-aminophenylthio)-3-nitropyridine in place of the 2-(2'-aminophenylthio)-3-nitropyridine in Example 4, there is obtained 2'-(3-nitro-2-pyridylthio)-4'-chloro-acetanilide.

EXAMPLE 6

2'-(6-Chloro-3-Nitro-2-Pyridylthio)Acetanilide

By employing 2 moles of 2-(2'-aminophenylthio)-6-chloro-3-nitropyridine in place of the 2-(2'-aminophenylthio)-3-nitropyridine in Example 4, there is obtained 2'-(6-chloro-3-nitro-2-pyridylthio)acetanilide.

Other acid anhydrides and/or acyl halides may be used instead of the acetic anhydride in the procedures of Examples 4, 5 and 6 to yield the corresponding N-acylated derivatives. The exact chemical nature of the acylating agent is unimportant, since its function is merely to protect the amino radical during the next two steps of the preferred process of this invention, after which it is removed by hydrolysis and thus does not appear in the final therapeutically active products of this invention.

The following three examples illustrate methods for preparing the 10-acylated-1-azaphenothiazines of this invention:

EXAMPLE 7

10-Acetyl-1-Azaphenothiazine

A mixture of 21.7 g. (0.33 mole) of potassium hydroxide (85%) in 175 ml. of 95% alcohol and 6 liters of acetone is diffused while stirring for 20 minutes with nitrogen and 95.3 g. (0.33 mole) of 2'-(3-nitro-2-pyridylthio)acetanilide added in one portion. The acetone is then distilled under nitrogen as rapidly as possible (45 minutes) from the steam bath to a volume of approximately 500 ml. The residue is cooled and an equal volume of cold water added and the product filtered, M.P. about 163–165°, yield approximately 62 g. (78%). A sample purified by recrystallization from isopropanol melts at about 171–172°.

Analysis.—Calcd. for $C_{13}H_{10}N_2OS$: C, 64.43; H, 4.16. Found: C, 64.70; H, 4.06.

EXAMPLE 8

8-Chloro-10-Acetyl-1-Azaphenothiazine

By substituting 2'-(3-nitro-2-pyridylthio)-4'-chloroacetanilide for 2'-(3-nitro-2-pyridylthio)acetanilide in the procedure of Example 7, 8-chloro-10-acetyl-1-azaphenothiazine is prepared.

EXAMPLE 9

2-Chloro-10-Acetyl-1-Azaphenothiazine

By substituting 2'-(6-chloro-3-nitro-2-pyridylthio)acetanilide for 2'-(3-nitro-2-pyridylthio)acetanilide in the procedure for Example 7, 2-chloro-10-acetyl-1-azaphenothiazine is prepared.

The following three examples illustrate methods for preparing the 1-azaphenothiazines of this invention:

EXAMPLE 10

1-Azaphenothiazine

A mixture of 200 g. (1.07 mole) of 10-acetyl-1-azaphenothiazine, 2.5 liters of 95% alcohol, and 375 ml. of concentrated hydrochloric acid is gently refluxed on the steam bath for 1 hour. The reaction mixture is then cooled to room temperature and neutralized while cooling with aqueous concentrated ammonia. After filtration, it is concentrated to a thick slurry and the residue filtered and stirred with two 500-ml. portions of water. The product is taken up into three 750 ml. portions of boiling benzene, dried by azeotropic distillation and precipitated from the combined concentrated extracts (ca. 350 ml.) with hexane, M.P. about 106–108°, yield about 170 g. This material is recrystallized from isooctane to yield about 131.5 g. (61%) of product, M.P. about 108–113°. A second recrystallization from hexane gives a product, M.P. about 112–114°.

*Analysis.*—Calcd. for $C_{11}H_8N_2S$: N, 13.99. Found: N, 14.16.

This product is also obtained by the simultaneous cyclization and hydrolysis of 2'-(3-nitro-2-pyridylthio)-acetanilide to 1-aza-phenothiazine by the method described by Yale, J. Am. Chem. Soc. 77, 2270 (1955).

EXAMPLE 11

8-Chloro-1-Azaphenothiazine

By substituting an equivalent amount of 8-chloro-10-acetyl-1-azaphenothiazine for the 10-acetyl-1-azaphenothiazine in the procedure of Example 10, 8-chloro-1-azaphenothiazine is prepared.

EXAMPLE 12

2-Chloro-1-Azaphenothiazine

By substituting an equivalent amount of 2-chloro-10-acetyl-1-azaphenothiazine for the 10-acetyl-1-azaphenothiazine in the procedure of Example 10, 2-chloro-1-azaphenothiazine is prepared.

8-chloro-1-azaphenothiazine and 2-chloro-1-azaphenothiazine can also be prepared directly from 2-(4'-chloro-2'-aminophenylthio)-3-nitropyridine and 2-(2'-aminophenylthio)-6-chloro-3-nitropyridine, respectively, by the method described by Yale, supra. In a similar manner, other 2-(2'-aminophenylthio)-3-nitropyridines of the general formula

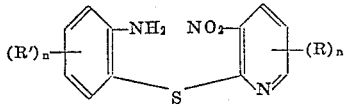

wherein R, R' and *n* are as hereinbefore defined and can be converted to the corresponding 1-azaphenothiazines of the general formula

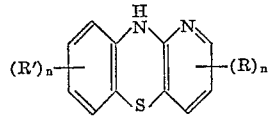

either directly by treatment of the former with two equivalents of alkali (see Yale, supra) or in a three-step process as illustrated in Examples 4, 7 and 10.

The following examples illustrate methods for preparing the 10-amino(lower alkyl)-1-azaphenothiazines of this invention:

EXAMPLE 13

10-(3'-Dimethylaminopropyl)-1-Azaphenothiazine and Salts Thereof (a) *10-(3'-dimethylaminopropyl)-1 - azaphenothiazine.* —A mixture of 20 g. (0.1 mole) of 1-azaphenothiazine, 4.3 g. (0.11 mole) of sodamide and 300 ml. of dry toluene is stirred and refluxed for eight hours. A slow stream of dry nitrogen gas is used to sweep out the ammonia as formed. The mixture is cooled and 110 ml. of a 1 M solution of 3-dimethylaminopropyl chloride in toluene is added dropwise, with stirring. Subsequently, the mixture is stirred and refluxed for fifteen hours, cooled, and concentrated in vacuo. The viscous residue is refluxed with 500 ml. of chloroform and filtered hot. The chloroform filtrate is treated with activated charcoal and again filtered. The filtrate is concentrated and the residue distilled to give about 19.8 g. (69% yield) of product, an oil distilling at about 195–198° C. (under 0.5 mm. pressure of mercury).

*Analysis.*—Calcd. for $C_{16}H_{19}N_3S$: C, 67.33; H, 6.70; N, 14.72. Found: C, 67.49; H, 6.44; N, 14.81.

(b) *10-(3'-dimethylaminopropyl)-1 - azaphenothiazine, hydrochloride.*—To a solution of 16.4 g. (0.058 mole) of the free base (section *a*) in 75 ml. of dry acetonitrile is added dropwise while cooling (ice bath) and stirring 14.5 ml. (0.053 mole) of 3.6 N ethereal hydrogen chloride. An equal volume of anhydrous ether is added and the product altered, dried and recrystallized from monochlorobenzene. The product melts at about 177–178° with sintering at about 176°. The yield is about 11.0 g. (60%).

*Analysis.*—Calcd. for $C_{16}H_{19}N_3S \cdot HCl$: C, 59.70; H, 6.26; N, 13.05; Cl, 11.01. Found: C, 59.60; H, 5.96; N, 12.66; 12.62; Cl, 10.21.

(c) *10-(3'-dimethylaminopropyl)-1 - azaphenothiazine dihydrochloride.*—To 1 g. of base (section *a*) in 10 ml. anhydrous ether is added with cooling and stirring 0.8 ml. 3.6 N ethereal HCl. The solid which separates is recrystallized from acetonitrile to give the product, M.P. about 205–207°.

*Analysis.*—Calcd. for $C_{16}H_{19}N_3S \cdot 2HCl$: N, 11.72; Cl, 19.77. Found: N, 11.52; Cl, 19.74.

(d) *10-(3'-dimethylaminopropyl)-1 - azaphenothiazine, oxalate.*—To 1 g. of base in 10 ml. of acenotrile is added a solution of 0.32 g. oxalic acid in 5 ml. of acetonitrile. The solid which separates is recrystallized from water to give the product, M.P. about 201–202°.

*Analysis.*—Calcd. for $C_{16}H_{19}N_3S \cdot (CO_2H)_2$: C, 57.58; H, 5.63; N, 11.19. Found: C, 58.06, 58.10; H, 5.38, 5.52; N, 11.01.

EXAMPLE 14

10-(2'-Dimethylaminoethyl-1-Azaphenothiazine and Salts Thereof (a) *10-(2'-dimethylaminoethyl)-1-azaphenothiazine.*— By substituting 110 ml. of a 1 M solution of 2-dimethylaminoethyl chloride in toluene for the 3-dimethylaminopropyl chloride in Example 13, section *a*, and reducing the reflux time to ten hours, 10-(2'-dimethylaminoethyl)-1-azaphenothiazine is obtained in about 71% yield. The product distills at about 183–185° C. (under 0.5 mm. of mercury).

*Analysis.*—Calcd. for $C_{15}H_{17}N_3S$: N, 15.48. Found: N, 15.23.

(b) *10 - (2'-dimethylaminoethyl)-1-azaphenothiazine, hydrochloride.*—To a solution of 19.2 g. (0.074 mole) of the free base (section *a*) in 125 ml. of dry acetonitrile cooled in an ice bath is added dropwise while stirring vigorously 18.2 ml. (0.068 mole) of 3.6 N ethereal hydrogen chloride. The product (about 18 g.) recrystallizes from acetonitrile without change in melting point about 196–197°, yield approximately 15.5 g. (75%).

Analysis.—Calcd. for $C_{15}H_{17}N_3S \cdot HCl$: N, 13.65; Cl, 11.51; C, 58.69; H, 5.90. Found: N, 13.64; Cl, 10.48; C, 59.03; H, 5.66.

In a similar manner, by substituting an equivalent amount of the appropriate amine (lower alkyl) halide for the 3-dimethylaminopropyl chloride in the procedure of Example 13, the following bases and/or hydrochloride salts are prepared:

EXAMPLE 15

*10-(3'-Pyrrolidinopropyl)-1-Azaphenothiazine and Hydrochloride Salt*

The base has a boiling point of about 203–206° C. (under 0.5 mm. pressure of mercury).

Analysis.—Calcd. for $C_{18}H_{21}N_3S$: C, 69.41; H, 6.79. Found: C, 68.75; H, 5.77. The hydrochloride salt has an M.P. of about 180–181° C. Analysis.—Calcd. for $C_{18}H_{21}N_3S \cdot HCl$: N, 12.07; C, 62.14; H, 6.37. Found: N, 11.90; C, 62.07; H, 6.30.

EXAMPLE 16

*10-(3'-Piperidinopropyl)-1-Azaphenothiazine and Hydrochloride Salt*

The base has a boiling point of about 234–238° C. (under 0.4 mm. pressure of mercury).

Analysis.—Calcd. for $C_{19}H_{23}N_3S$: N, 12.91. Found: N, 12.68. The hydrochloride salt has an M.P. of about 179.5–180.5° C. Analysis.—Calcd. for $C_{19}H_{23}N_3S \cdot HCl$: N, 11.61; C, 63.05; H, 6.68. Found: N, 11.56; C, 63.10; H, 6.41.

EXAMPLE 17

*10-(1'-Methyl-3'-Piperidylmethyl)-1-Azaphenothiazine and Hydrochloride Salt Thereof*

(a) *Method I.*—A Solution of 129 g. of 1-methyl-3-piperidinemethanol [cf. Sandborn and Marvel, J. Am. Chem. Soc. 50.563 (1928)], in 500 ml. of dry chloroform is cooled and treated dropwise with 208 g. of purified thionyl bromide. Subsequently, the mixture is allowed to warm to room temperature and kept overnight. The crystalline precipitate of 1-methyl-3-piperidinemethyl bromide hydrobromide is filtered off and washed with ether. The hydrobromide is dissolved in the minimum amount of cold water and the solution saturated with potassium carbonate; the liberated 1-methyl-3-piperidinemethyl bromide is extracted into ether, the ether solution is dried, concentrated and distilled to give the 1-methyl-3-piperidinemethyl bromide as a somewhat viscous yellow oil.

By employing the procedure outlined in Example 13, the 1-methyl-3-piperidinemethyl bromide is condensed with 1-azaphenothiazine to give 10-(1'-methyl-3'-piperidylmethyl)-1-azaphenothiazine. The product is obtained as a yellow oil which formed a crystalline hydrochloride.

(b) *Method II.*—A mixture of 20 g. of 1-azaphenothiazine, 15.7 g. of 1-methylnipecotic acid chloride and 100 ml. of dry toluene is refluxed for 8 hours and concentrated to dryness in vacuo. The residual oil, about 28 g., which soon crystallizes, is 10-(1'-methylnipecotyl)-1-azaphenothiazine. 27 g. of this compound is added in small portions to a stirred solution of 3 g. of lithium aluminum hydride in 500 ml. of dry ether. Subsequently, the mixture is stirred and refluxed for 2 hours, cooled and hydrolyzed by the dropwise addition of 10 ml. of water. The ether solution is separated, dried, concentrated, and the residue distilled to give 10-(1'-methyl-3'-piperidylmethyl)-1-azaphenothiazine.

EXAMPLE 18

*10-(2'-Hydroxy-3'-Diethylaminopropyl)-1-Azaphenothiazine*

A mixture of 20 g. (0.1 mole) 1-azaphenothiazine, 4.3 g. of sodamide and 500 ml. of dry toluene is stirred and refluxed for 8 hours, cooled and treated with 14.2 g. (0.11 mole) of 1,2-epoxy-3-diethylaminopropane in 50 ml. of toluene. Subsequently, the mixture is stirred and refluxed for 10 hours and the product isolated as described in Example 13. The base distills at about 208–212° (under 0.8 mm. of mercury). The yield is about 16 g.

The base forms a crystalline oxalate, M.P. about 154–155°.

Analysis.—Calcd. for $C_{18}H_{23}N_3SO \cdot (CO_2H)_2$: C, 57.26; H, 6.00; N, 10.01. Found: C, 57.15; H, 6.05; N, 10.13.

EXAMPLE 19

*10-(3'-Aminopropyl)-1-Azaphenothiazine*

(a) *10-(2-cyanoethyl)-1-azaphenothiazine.*—To a stirred mixture of 20 g. of 1-azaphenothiazine and 21.2 g. of acrylonitrile is added 0.5 ml. of a 40% solution of benzyltrimethylammonium hydroxide. A spontaneous reaction results and the mixture becomes warm. Subsequently, the mixture is refluxed for one hour and cooled to give 10-(2-cyanoethyl)-1-azaphenothiazine as a crystalline solid.

(b) *10-(3-aminopropyl)-1-azaphenothiazine.*—To a solution of 1.9 g. of lithium aluminum hydride in 500 ml. of dry ether is added 25.3 g. of 10-(2-cyanoethyl)-1-azaphenothiazine in small portions with stirring. Subsequently, the mixture is stirred and refluxed for 2 hours, cooled, hydrolyzed with water. The 10-(3-aminopropyl)-1-azaphenothiazine is isolated in the usual manner as a viscous oil which forms a crystalline hydrochloride.

EXAMPLE 20

*10-(3'-Dimethylaminopropyl)-1-Azaphenothiazine*

A mixture of 12.9 g. of 10-(3-aminopropyl)-1-azaphenothiazine (obtained by the procedure of Example 19), 4.0 g. of 37% formalin solution and 9.2 g. of 100% formic acid is heated for 3 hours on the steam bath, cooled, and diluted with water. The solution is made alkaline with potassium carbonate solution and the liberated base extracted with ether. The ether extracts are dried, concentrated and distilled to give about a 70% yield of 10-(3-dimethylaminopropyl)-1-azaphenothiazine, which distills at about 195° C. (under 0.5 mm. of mercury). This base forms a hydrochloride identical with the hydrochloride obtained by the method described before.

EXAMPLE 21

*8-Chloro-10-(3'-Dimethylaminopropyl)-1-Azaphenothiazine and Salts Thereof*

8-chloro-1-azaphenothiazine is condensed with dimethylaminopropyl chloride in toluene solution by means of sodamide in accordance with the procedure of Example 13. The reaction results in the preparation of 8-chloro-10-(3'-dimethylaminopropyl)-1-azaphenothiazine in about 60% yield. This compound readily forms a crystalline monohydrochloride.

EXAMPLE 22

*2-Chloro-10-(3'-Dimethylaminopropyl)-1-Azaphenothiazine and Salts Thereof*

2-chloro-1-azaphenothiazine is condensed with dimethylaminopropyl chloride in toluene solution by means of phenyllithium in accordance with the procedure of Example 13. The reaction results in the preparation of 2-chloro-10-(3'-dimethylaminopropyl)-1-azaphenothiazine. This compound forms a crystalline hydrochloride salt.

In the procedures of Examples 13 through 22, other acid acceptors, such as lithium amide, phenyllithium, methyllithium, potassium amide, and powdered dry sodium and potassium hydroxide can be substituted for the sodamide without qualitatively affecting the results.

In the procedure of section "(b) Method II" of Example 17, substitution of the 1-methylnipecotic acid chloride by 15 g. diethylamino acetyl chloride yields 10-(dimethylaminoacetyl)-1-azaphenothiazine.

The invention may be otherwise variously embodied within the scope of the appended claims.

We claim:
1. A compound of the formula

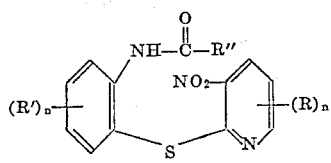

wherein R and R' are selected from the group consisting of hydrogen, halogen, hydroxy, lower alkyl, lower alkoxy and trihalo (lower alkyl), $n$ is an integer less than four, and R" is hydrocarbon of less than ten carbon atoms selected from the group consisting of lower alkyl, aryl and aralkyl.

2. 2-(2'-Lower alkenoylamidophenylthio)-3-nitropyridine.

References Cited in the file of this patent
UNITED STATES PATENTS 2,645,640   Charpentier _____ July 14, 1953
2,943,086   Yale et al. _____ June 28, 1960

OTHER REFERENCES

Lowy et al.: Introduction to Org. Chem., 6th edition, page 213, (1945).

Takahashi et al.: Chem. Abstracts, volume 44, column 1977 (1950).

Elderfield: "Heterocyclic Compounds," volume 6, pages 641, 686–7 (1957).